US010661182B2

(12) United States Patent
Abulencia et al.

(10) Patent No.: US 10,661,182 B2
(45) Date of Patent: May 26, 2020

(54) ELECTRONIC PROCESSING SYSTEM WITH SOCIAL NETWORK MECHANISM AND METHOD OF OPERATION THEREOF

(71) Applicant: SONY INTERACTIVE ENTERTAINMENT NETWORK AMERICA LLC, San Mateo, CA (US)

(72) Inventors: Jason Abulencia, San Diego, CA (US); Murray Hume, Herfordshire (GB); Nitin Mohan, San Francisco, CA (US); Dominic Kieran Graziano, San Jose, CA (US)

(73) Assignee: SONY INTERACTIVE ENTERTAINMENT NETWORK AMERICA LLC, San Mateo, CA (US)

( * ) Notice: Subject to any disclaimer, the term of this patent is extended or adjusted under 35 U.S.C. 154(b) by 265 days.

(21) Appl. No.: 15/246,772

(22) Filed: Aug. 25, 2016

(65) Prior Publication Data
US 2017/0056776 A1    Mar. 2, 2017

Related U.S. Application Data

(60) Provisional application No. 62/210,178, filed on Aug. 26, 2015.

(51) Int. Cl.
*A63F 13/85* (2014.01)
*G06F 16/2457* (2019.01)
*A63F 13/60* (2014.01)

(52) U.S. Cl.
CPC .............. *A63F 13/85* (2014.09); *A63F 13/60* (2014.09); *G06F 16/24578* (2019.01); *G06Q 2230/00* (2013.01)

(58) Field of Classification Search
CPC .... G06Q 30/02; G06Q 2230/00; G06F 17/30; G06F 3/00; G06F 16/24578; A63F 13/00; A63F 13/85; A63F 13/60
See application file for complete search history.

(56) References Cited

U.S. PATENT DOCUMENTS

| | | | |
|---|---|---|---|
| 9,101,836 B1* | 8/2015 | Brenden | A63F 13/86 |
| 10,143,916 B1* | 12/2018 | Hawk | A63F 13/00 |
| 2005/0110803 A1* | 5/2005 | Sugimura | G06T 15/503 |
| | | | 345/629 |
| 2009/0111576 A1* | 4/2009 | Ostergren | A63F 13/533 |
| | | | 463/29 |
| 2011/0184780 A1* | 7/2011 | Alderson | G06Q 30/02 |
| | | | 705/7.32 |
| 2012/0036482 A1* | 2/2012 | Haynes, II | G06Q 30/0201 |
| | | | 715/838 |
| 2013/0174055 A1* | 7/2013 | Johnson | H04N 21/4758 |
| | | | 715/753 |

(Continued)

*Primary Examiner* — Jasson H Yoo
(74) *Attorney, Agent, or Firm* — Haverstock & Owens LLP

(57) ABSTRACT

An electronic processing system, and a method of operation thereof, including: a source module for providing a voting content of a game for utilizing a content voting feature in a social gaming network; a vote module, coupled to the source module, for generating votes for the game based on the voting content by selecting a game title of the game in a voting timeframe during a development of the game, the votes generated for exclusive memberships; and a result module, coupled to the vote module, for generating a voting result based on the votes in the voting timeframe for displaying on a screen.

18 Claims, 13 Drawing Sheets

(56) References Cited

U.S. PATENT DOCUMENTS

2015/0120717 A1* 4/2015 Kim .................. G06F 17/30699
707/727
2016/0005257 A1* 1/2016 Logston ................ A63F 13/803
463/25

* cited by examiner

CONTENT VOTING TOOL: VIEW VOTING CAMPAIGN

CONTENT VOTING TOOL

| CAMPAIGNS | ADMIN | ENGINEER | | | | | | | | |
|---|---|---|---|---|---|---|---|---|---|---|

VOTING CAMPAIGNS

Q FILTER  ● ACTIVE  INACTIVE  ALL                                      + ADD  COLUMNS 10

| ▲STATUS | CAMPAIGN NAME | START DATE | END DATE | LOCALES | VOTING START | VOTING END | | | PUBLISH | RESULTS |
|---|---|---|---|---|---|---|---|---|---|---|
| ☑ | SEPTEMBER PS+ VOTE | 09/01/14 | 09/30/14 | 6 | 09/04/14 | 09/28/14 | NPMT | NP | | RESULTS |
| ☑ | OCTOBER PS+ VOTE | 10/01/14 | 10/31/14 | 13 | 10/02/14 | 10/29/14 | NPMT | NP | | RESULTS |
| ☑ | NOVEMBER PS+ VOTE | 11/01/14 | 11/30/14 | 16 | 11/03/14 | 11/27/14 | NPMT | NP | | RESULTS |
| ☑ | DECEMBER PS+ VOTE | 12/01/14 | 12/31/14 | 32 | 12/04/14 | 12/30/14 | NPMT | NP | | RESULTS |
| ☐ | JANUARY PS+ VOTE | 01/01/15 | 01/31/15 | 4 | 01/02/15 | 01/28/15 | NPMT | NP | | RESULTS |
| ☑ | FEBRUARY PS+ VOTE | 02/01/15 | 02/28/15 | 1 | 02/03/15 | 02/25/15 | NPMT | NP | | RESULTS |
| ☑ | MARCH PS+ VOTE | 03/01/15 | 03/31/15 | 6 | 03/04/15 | 03/28/15 | NPMT | NP | | RESULTS |
| ☐ | APRIL PS+ VOTE | 04/01/15 | 04/30/15 | 6 | 04/04/15 | 04/29/15 | NPMT | NP | | RESULTS |
| ☐ | MAY PS+ VOTE | 05/01/15 | 05/31/15 | 6 | 05/03/15 | 05/29/15 | NPMT | NP | | RESULTS |
| ☐ | JUNE PS+ VOTE | 06/01/15 | 06/30/15 | 6 | 06/02/15 | 06/27/15 | NPMT | NP | | RESULTS |

SHOWING 1 TO 10 OF 10 ENTRIES

FIG. 13

200
ELECTRONIC PROCESSING SYSTEM WITH SOCIAL NETWORK MECHANISM AND METHOD OF OPERATION THEREOF

CROSS-REFERENCE TO RELATED APPLICATION(S)

This application claims the benefit of U.S. Provisional Patent Application Ser. No. 62/210,178 filed Aug. 26, 2015, and the subject matter thereof is incorporated herein by reference thereto.

TECHNICAL FIELD

The present invention relates generally to an electronic processing system and more particularly to a system for electronic processing with social network.

BACKGROUND ART

Social networking is a practice of expanding a number of one's business and/or social contacts by making connections through individuals. While social networking has gone on almost as long as societies have existed, an unparalleled potential of the Web to facilitate such connections has been recognized and exploited, through Web-based groups established for that purpose.

The world of the Internet is changing rapidly. Social networking allows users to become increasingly comfortable with making a significant percentage of their purchases online. Over the past years, there has been a remarkable transformation in the kind of content available online. Video in both short form and long form is now readily available through multiple portals and platforms. However, electronic processing systems that support the social networking are currently still encountering problems due to lack of innovative solutions that effectively deliver quality of contents to target audiences.

Thus, a need still remains for an electronic processing system that delivers innovation and technological advances to enable the users to effectively share and efficiently distribute proper the contents within social networks. In view of the increasing demand for such electronic processing systems, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

Embodiments of the present invention provide a method of operation of an electronic processing system including: providing a content voting mechanism for digital content in a social gaming network; generating votes for the game, based on the voting content, by selecting a game in a voting timeframe, during a development of the game, the votes generated are for exclusive memberships; and generating a voting result based on the votes in the voting timeframe for displaying on a screen.

The embodiments of the present invention provide an electronic processing system, including: a source module for providing information about a game for utilizing a content voting feature in a social gaming network; a vote module, coupled to the source module, for generating votes for the game based on the voting content by selecting a game title of the game in a voting timeframe during a development of the game, the votes generated for exclusive memberships; and a result module, coupled to the vote module, for generating a voting result based on the votes in the voting timeframe for displaying on a screen.

Certain embodiments of the invention have other steps or elements in addition to or in place of those mentioned above. The steps or the elements will become apparent to those skilled in the art from a reading of the following detailed description when taken with reference to the accompanying drawings.

BRIEF DESCRIPTION OF THE DRAWINGS

FIG. 13 is an example of one of the screens with presentation of the voting campaigns.

BEST MODE FOR CARRYING OUT THE INVENTION

Figure 1:
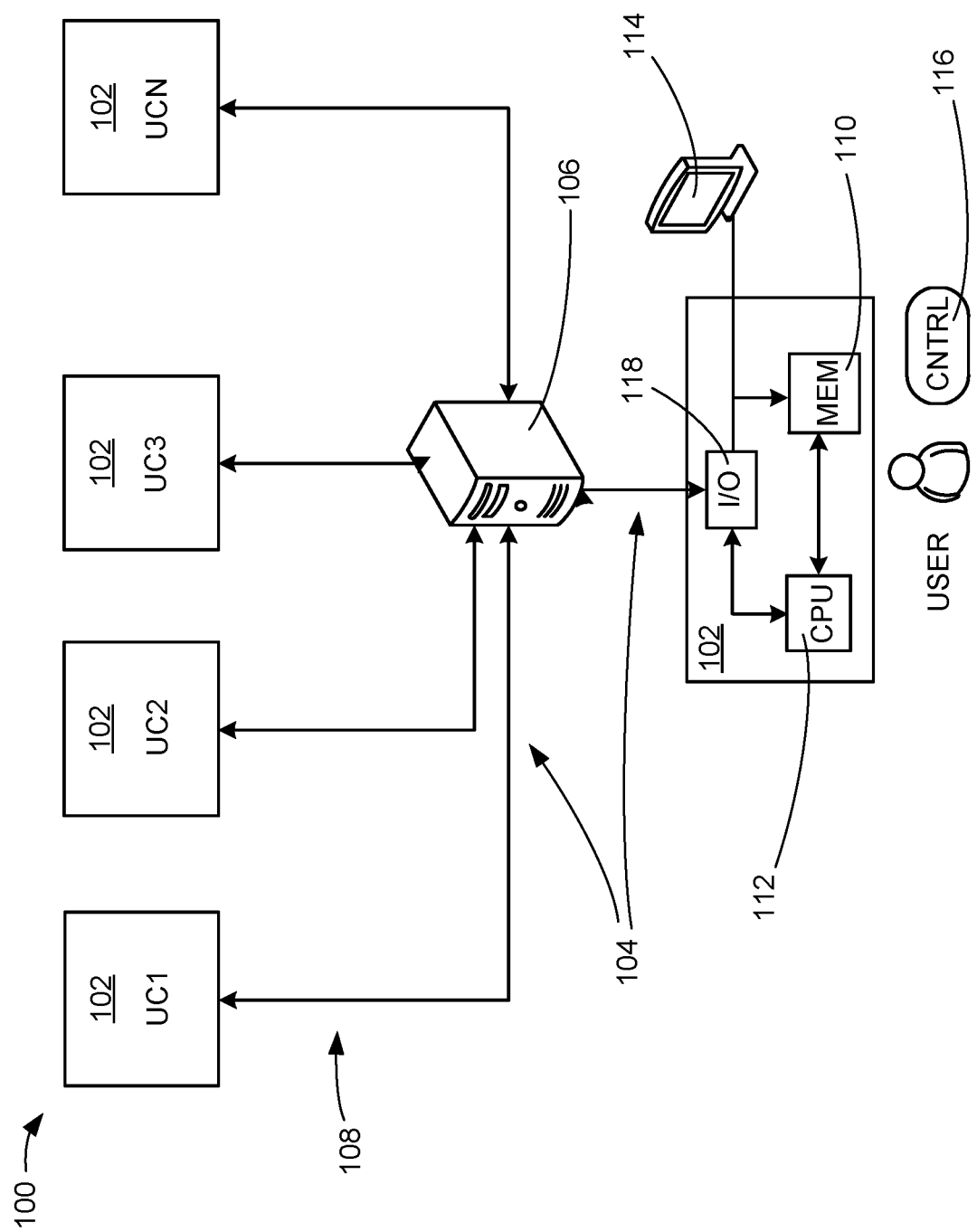
FIG. 1 is a system block diagram of an electronic processing system with a social network mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the embodiments of the present invention.

In the following description, numerous specific details are given to provide a thorough understanding of the invention. However, it will be apparent that the invention may be practiced without these specific details. In order to avoid obscuring the embodiments of the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the embodiments of the present invention.

The term "module" referred to herein can include software, hardware, or a combination thereof in the embodiments of the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Referring now to FIG. 1, therein is shown a system block diagram of an electronic processing system 100 with a social network mechanism in an embodiment of the present invention. The system block diagram shows a plurality of game consoles 102 utilized by users in a social gaming network 104.

The game consoles 102 are devices that process information including video signals and visual images for video games. For example, the game consoles 102 can include PlayStation 4 (PS4) and any other video game consoles. Also for example, the game consoles 102 can include tablets, PlayStation Vita, handheld game consoles, or any other portable gaming devices.

The social gaming network 104 provides interconnections of platforms, systems, and applications for exchanging information. In the social gaming network 104, networked computing devices exchange data with each other using a data link between nodes that are established using either cable media or wireless media. For example, the social gaming network 104 can include a PlayStation Network (PSN) and any other gaming networks.

The users can engage in game plays or other activities. Information relating to such activities can be sent to a number of servers 106. The servers 106 are devices that manage access to a centralized resource or service in a network. The social gaming network 104 includes a number of user connections 108 (UC) between the game consoles 102 and the servers 106. The user connections 108 are the interconnections that provide communications mechanisms for exchanging information among the platforms, the systems, and the applications.

The electronic processing system 100 can include one or more of the servers 106 used for obtaining information relating to the activities of the users from the game consoles 102. The information relating to the activities of the user connections 108 is transmitted to a storage device 110 in each of the game consoles 102 for later presentation on a display.

For example, the activities can include game plays or any other actions or events of the users associated with the video games. Also for example, the storage device 110 can include volatile and nonvolatile memory devices.

The users can see all comments posted by the user connections 108. The comments and game shares including screen shots can be handled by a processor 112 of each of the game consoles 102. For example, the processor 112 can include a central processing unit (CPU) or any other computing devices.

Display devices 114 can be separate from the game consoles 102 or integrated within the game consoles 102. The display devices 114 output the video signals or the visual images for the video games.

Controllers 116 are devices that the users utilize with game or entertainment systems to manipulate or control the game consoles 102. The controllers 116 provide input to the video games to control objects or characters in the video games. The controllers 116 can be separate from the game consoles 102 or integrated within the game consoles 102. For example, the controllers 116 can include G-Shock controllers or any other control devices.

Each of the game consoles 102 includes an input/output unit 118 (I/O) for providing input and output functions or data transmission. The input/output unit 118 provides the data transmission between the game consoles 102 and the servers 106, the display devices 114, and the controllers 116.

Figure 2:
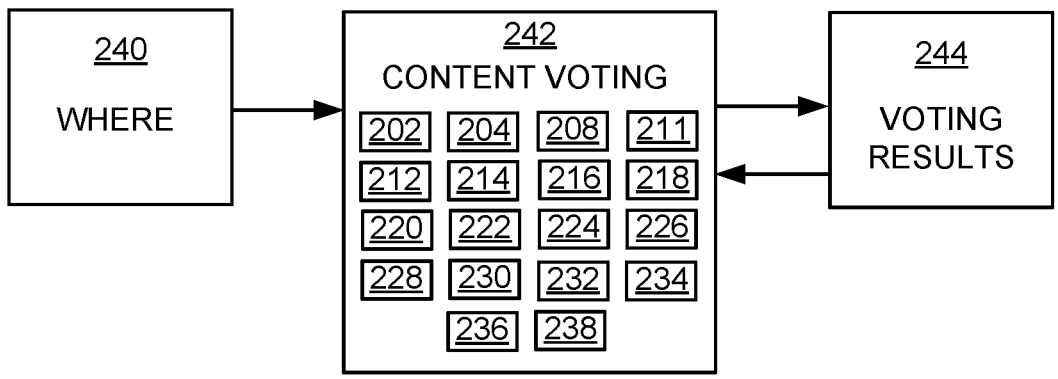
FIG. 2 is a block diagram of a content voting feature in the electronic processing system of FIG. 1.

Referring now to FIG. 2, therein is shown a block diagram of a content voting feature 202 in the electronic processing system 100 of FIG. 1. A vote-to-play feature or the content voting feature 202 includes a capability that enables members 204 in the social gaming network 104 of FIG. 1 to review a predetermined number of games 208 and select one of the games 208 that the members 204 are most interested among all of the games 208 that are reviewed.

The members 204 are users, of the game consoles 102 of FIG. 1 in the electronic processing system 100, who have registered for accounts in the electronic processing system 100. The members 204 vote by viewing a number of the games 208 that are specifically available for the content voting feature 202, reviewing the games 208, and deciding to select only one of the games 208 as the most favorite or of most interest among the games 208.

The members 204 are able to utilize the content voting feature 202 after they are registered for the accounts. As such, non-members 211 do not have an exclusive access to the content voting feature 202.

The games 208 can have game titles 212, which are information that uniquely describe the games 208. The content voting feature 202 can be utilized by the members 204 to create an instant game collection 214, which includes a group of the games 208 that are freely available for the members 204 to play. The games 208 are available for free when the members 204 do not have to pay.

Game developers of all the games 208 can find out interests of the members 204 using the selection process of the content voting feature 202. However, a kicker or an addition criteria for the game developers to consider is that the games 208 may be offered or available for free as part of the instant game collection 214 (IGC).

Once available in the instant game collection 214, the games 208 can be played at any time in the social gaming network 104 as a member. The instant game collection 214 includes a number of the games 208 that are free to play on the game consoles 102 if acquired during its free offer timeframe.

The content voting feature 202 allows the members 204 to select a game 208 they want for free. In order to promote the game 208 they want for free and that is still in final product development phase and will be released in the future, the content voting feature is able to be used. The content voting feature 202 is provided only to the members 204 of the game consoles 102 in the social gaming network 104.

The embodiments of the present invention disclose a method, which allows the members 204 with entertainment service subscriptions using the accounts to vote on the game titles 212. The members 204 vote for the games 208 that the members want include in the instant game collection 214.

Vote contents 218 include information that the members 204 review to decide which of the game titles 212 to select. The vote contents 218 refer to the games 208 that are in the product development phase and so not available for release to the users in the electronic processing system 100.

One of the game titles 212 that receives a highest number 220 of votes 222 is offered for free and is part of the instant game collection 214. The game titles 212 that do not receive the highest number 220 of the votes 222 can be offered or available at discounted or reduced rates 224. The votes 222 are selections of the game titles 212 made by the members 204.

The highest number 220 of the votes 222 refers to a selection of one of the game titles 212 interested by a number of the members 204 greater than a number of the members 204 who are interested in all others of the game titles 212, whereby the game titles 212 are selected specifically for the content voting feature 202. The reduced rates 224 are numerical values associated with the game titles 212.

When the games 208 are not part of a selection process of the content voting feature 202, the games 208 have predetermined values based on demands or popularities of the games 208. When the games 208 are part of the selection process but the games 208 do not have the highest number 220 of the votes 222, the games 208 can be available to the members 204 at the reduced rates 224 lower than the predetermined values.

The content voting feature 202 allows or enables only the members 204 with exclusive memberships 226 a chance to vote on which of the games 208 the members 204 want to include as part of the instant game collection 214. The exclusive memberships 226 are associations with a group of the users in the social gaming network 104.

The exclusive memberships 226 are established by the users registering for the accounts in order for the users to become the members 204 to have a benefit of the content voting feature 202. The exclusive memberships 226 can be provided to the members 204.

The exclusive memberships 226 provide a gaming community a freedom of choice to select the games 208 of interest by submitting the votes 222. Although the exclusive memberships 226 are provided to vote for the games 208, it is understood that the exclusive memberships 226 can be provided to vote for other areas of interests. For example, the exclusive memberships 226 can be provided to vote for other content types including video, music, and any other contents.

All of the vote contents 218 subject to the selection process of the content voting feature 202 associate with the games 208 that are currently or to be in the product development phase during the selection process. Each of the games 208 that are currently in the product development phase can have an expected release date of when it may be available for the members 204 to play.

Developers of all of the games 208 can find out interests of the members 204 using the selection process of the content voting feature 202. However, a kicker or an additional criterion for the developers to consider is that the games 208 may be offered or available for free as part of the instant game collection 214 (IGC).

For the game titles 212 that do not get the highest number 220 of the votes 222 during the product development phase of the games 208 of the game titles 212 complete, the games 208 can continue to be developed, and then eventually available through online stores or websites at the reduced rates 224 only to the members 204.

The content voting feature 202 can be available as a global feature 228. The global feature 228 is a capability provided to all geographical regions 230 in the world with the users who are voting on the same vote contents or the game titles 212 on the social gaming network 104.

A voting mechanic or the selection process of the content voting feature 202 can be provided as a feature or functionality set up per one of the geographical regions 230. The voting mechanic can be set up per region by each region providing its own games to vote on and each region setting up its own voting timeframe. However, voting campaigns 232 can be utilized because the content voting feature 202 can be globally applied so that the users from all of the geographical regions 230 can participate.

The voting campaigns 232 is a mechanism having a series of selections of the games 208 for purposes of determining which of the games 208 has the highest number 220 of the votes 222. The voting campaigns 232 can include any period or duration. For example, the voting campaigns 232 can include a period of one month. The game titles 212 can be associated with the games 208 that are available only on a specific type of the game consoles 102.

The games that are able to be part of the content voting feature are dependent on the content acquisition group being able to lock down on game titles to be part of the voting feature.

The games that are part of the voting mechanism are provided a sum of money to continue and complete the development of the game titles. When a game title has been given the highest number of votes within the voting timeframe, that game title is given an additional reward.

The content voting feature 202 can be run or utilized as a campaign model. The campaign model refers to a mechanism using which consumers or the members 204 can be able to vote on a number of the game titles 212. The campaign model can include the voting campaigns 232.

For example, the members 204 can be limited to vote three to five of the game titles 212, given a voting timeframe 234. The voting timeframe 234 is a specific predetermined duration or period. As a specific example, the members 204 can vote on the game titles 212 that the members 204 want to be included in the instant game collection 214 from January $1^{st}$ through February $1^{st}$.

A number of the voting campaigns 232 can be no more than one during a campaign timeframe 236. The campaign timeframe 236 is a specific predetermined duration. For example, the number of the voting campaigns 232 can be no more than one per a quarter of a calendar year. The number of the voting campaigns 232 can be no more than one running or performed at a time.

A functionality of the content voting feature 202 can be provided only on the game consoles 102. The voting campaigns 232 can occur while the product development phase of the games 208 is in progress. The product development phase can complete in a period shortly after the voting campaigns 232 ends, for example, within the voting timeframe 234 of a month.

Each of the members 204 can vote a number of or a range of the game titles 212 of the games 208. For example, each of the members 204 can vote 3-5 of the game titles 212. Also for example, each of the members 204 can vote only one of the game titles 212 per the voting campaigns 232.

Each of the members 204 can vote as many times as each of the members 204 likes within the voting timeframe 234 of the voting campaigns 232. The members 204 can vote the game titles 212 including voting an entirety of each of the games 208 and not just each of the game titles 212 or names of the games 208.

Both the members 204 and the non-members 211 can have feelings of having choices in the instant game collection 214. Both the members 204 and the non-members 211 can have continuous engagement for more than the voting timeframe 234 of one month. The members 204 can have feelings of being stakeholders with the exclusive memberships 226 and interests of the games 208 that are in the product development phase. Both the members 204 and the non-members 211 can have awareness or a perception of the exclusive memberships 226 as producers of the games 208.

The content voting feature 202 can include a predefined number of the members that have reviewed the game titles 212 before submitting the votes 222. There may be at least eighty (80) percent of a total number of the members 204 have reviewed the game titles 212. There may be at least twenty (20) percent of the total number of the members 204 who have voted the game titles 212.

The content voting feature 202 provides an opportunity for the members 204 to acquire or sign up for the exclusive memberships 226 in order to vote for the game titles 212 of interest. The content voting feature 202 allows the members 204 to share the vote contents 218 of the games 208 using techniques including viral and buzz. The members 204 can access and view the game titles 212 before voting the game titles 212.

The content voting feature 202 can include a number of design principles. The content voting feature 202 can be designed such that there is no loser among the game titles 212 after the voting campaigns 232 end. The selection process of the game titles 212 can be fair and transparent.

The content voting feature 202 can available to only the members 204 with the exclusive memberships 226. The members 204 can change the votes 222 an unlimited number of times. The games 208 in the selection process can be identifiable as being brought to the users by ongoing and outside of the selection process, for example, with icons in a corner, splash screen with a message indicating "Plus Originals" for instance-content policy.

In the content voting feature 202, the users or the members 204 can be able to view a list of the game titles 212. The members 204 can be allowed to vote on one (1) of the game titles 212 per each of the voting campaigns 232. The members 204 can have an ability to change their vote, during the voting timeframe 234. The members 204 can only be allowed to vote within the voting timeframe 234. The users or the members 204 can have the ability to view voting results 238 during the voting timeframe 234.

The electronic processing system 100 includes a source module 240, a vote module 242, and a result module 244.

The source module 240 can be coupled to the vote module 242. The vote module 242 can be coupled to the result module 244.

The source module 240 provides discovery of the vote contents 218 or identifies where the vote contents 218 can be located and reviewed. The vote module 242 includes the content voting feature 202 for the members 204 to vote the game titles 212 of interest. The result module 244 determines and presents the voting results 238 based on the highest number 220 of the votes 222.

The vote module 242 can generate the votes 222 during the voting campaigns 232, whereby only one of the voting campaigns 232 occurs in the campaign timeframe 236 and globally applied to a number of the geographical regions 230. The vote module 242 can update the instant game collection 214 based on the game titles 212 having the highest number 220 of the votes 222 so that the members 204 can play the games 208 associated with the game titles 212 on the social gaming network 104.

It has been discovered that the content voting feature 202 improves the technology of social networking. The technology of social networking is improved because the content voting feature 202 enhances the user interfaces of the game consoles 102 that enable the members 204 to seamlessly vote for the game titles 212 of interest together with each other in the social gaming network 104 before the production development of the games 208.

It has also been discovered that the reduced rates 224 improves the technology of social networking. The technology of social networking is improved because the reduced rates 224 increase a number of the users that interactively play with each other in the social gaming network 104.

It has further been discovered that the members 204 having an option to change the votes 222 within the voting timeframe 234 improves the quality of the games 208. The quality is improved because the change of the votes 222 causes more competition among the game developers during the voting campaigns 232, thus continually providing better features of the games 208 that will be released after the production development phase completes.

It has further been discovered that the members 204 allowed to review more than one of the games 208 and vote for only one of the game titles 212 improves the quality of the games 208. The quality is improved because the review of more than one of the games 208 allows the members 204 to select the best of the game titles 212, which causes the game developers to continually provide better features of the games 208 at the end of the product development phase.

It has further been discovered that the exclusive memberships 226 improve interaction among the users of the game consoles 102. The interaction is improved because only the exclusive memberships 226 provide entertainment service subscriptions that allow the users a chance to vote for the games 208 that may rank the highest among the games 208, which will become readily available in the instant game collection 214 for the users to play with each other.

It has further been discovered that the game titles 212 voted prior to the product development phase improves the quality of the games 208. The quality is improved because the votes 222 generated prior to the product development phase causes the game developers to continually provide better features of the games 208 that will be released in the future.

It has further been discovered that the content voting feature 202 provided as the global feature 228 improves interaction among the users in the social gaming network 104. The interaction is improved because the content voting feature 202 is available globally in many of the geographical regions 230, resulting in more of the users to play with each other in the social gaming network 104.

It has further been discovered that no more than one of the voting campaigns 232 during the campaign timeframe 236 improves quality of the games 208. The quality is improved because limiting a number of the voting campaigns 232 to one in the campaign timeframe 236 improves the voting results 238 since the members 204 would focus on only that particular campaign and so more focused to provide a better review of the games 208.

It has further been discovered that the members 204 limited to vote a number of the game titles 212 in the voting timeframe 234 improves quality of the games 208. The quality is improved because limiting a number of the game titles 212 in the voting timeframe 234 improves the voting results 238 since the members 204 would focus on only a few selected ones of the game titles 212 and so would provide a better review of the games 208.

The source module 240, the vote module 242, and the result module 244 can be implemented with hardware units in the electronic processing system 100. For example, the source module 240, the vote module 242, and the result module 244 can be implemented with the game consoles 102 of FIG. 1, the social gaming network 104 of FIG. 1, the servers 106 of FIG. 1, the user connections 108 of FIG. 1, the storage device 110 of FIG. 1, the processor 112 of FIG. 1, the display devices 114 of FIG. 1, the controllers 116 of FIG. 1, the input/output unit 118 of FIG. 1, or a combination thereof.

Figure 3:
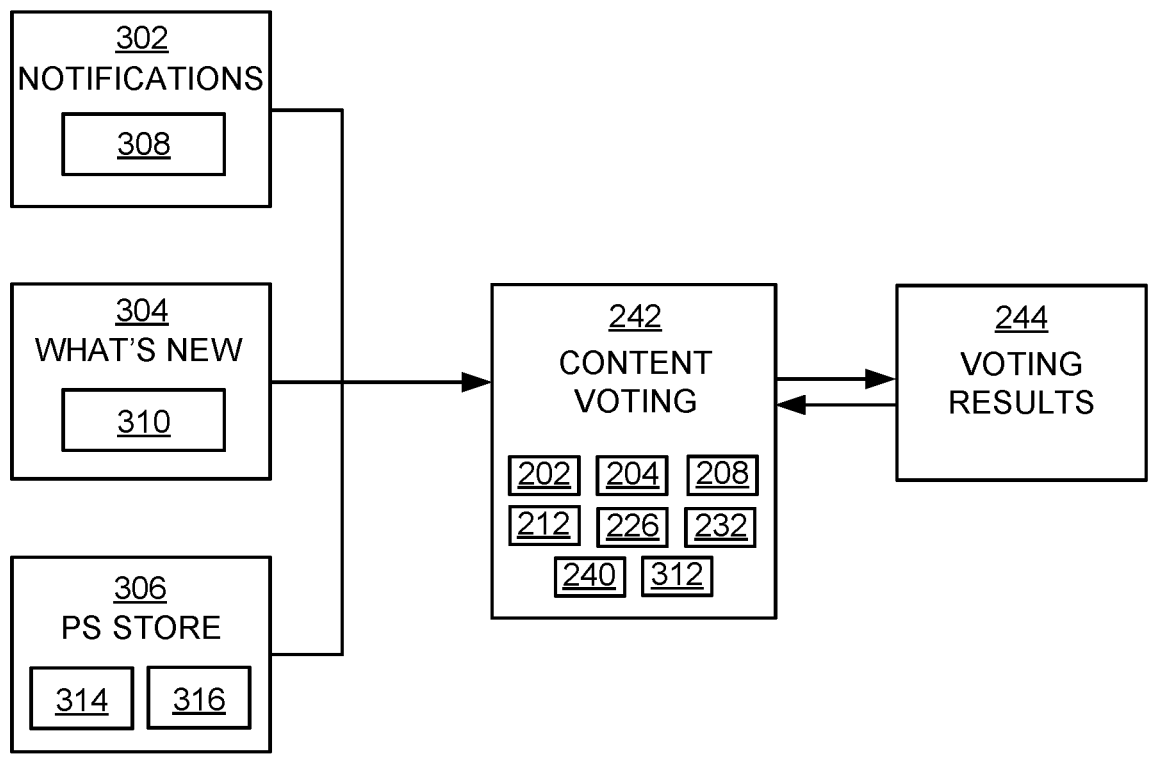
FIG. 3 is a first detailed block diagram of the content voting feature.

Referring now to FIG. 3, therein is shown a first detailed block diagram of the content voting feature 202. The electronic processing system 100 of FIG. 1 includes the source module 240, the vote module 242, and the result module 244.

The source module 240 discovers and accesses to the content voting feature 202. The source module 240 includes a notification module 302, an information module 304, and a game module 306. The notification module 302 can be coupled to the information module 304. The information module 304 can be coupled to the game module 306.

The notification module 302 generates system notifications 308 about the voting campaigns 232. The system notifications 308 are information or messages. The system notifications 308 are presented only to the members 204 who are active with the exclusive memberships 226.

The members 204 with the exclusive memberships 226 can receive the system notifications 308 on the game consoles 102 before or at the start of the voting campaigns 232. The result module 244 can generate the system notifications 308 for the content voting feature 202 in the voting campaigns 232. The vote module 242 can generate the votes 222 based on the system notifications 308.

The information module 304 can present new information 310. The new information 310 includes messages about what's new in the social gaming network 104 of FIG. 1. The new information 310 includes the game titles 212 that are trending or played by at least a predetermined percentage of the total number of the members 204.

Any of the members 204 can access the content voting feature 202 through the new information 310 presented in a What's New tile on screens 312 of display devices. The screens 312 are flat panels or areas on electronic devices including a television, a computer, or a smartphone, on which multimedia information are displayed. The What's New tile refers to a section of one of the screens 312 presented with messages or information.

The game module 306 generates information about the games 208 presented on the websites. The websites can be associated with the online stores. The game module 306 can generate banners 314 that can be presented on the screens 312. The banners 314 are information presented as messages or headings on a web page or on the screens 312 in a form of a bar, a column, or a box.

Any of the members 204 can access the content voting feature 202 from the banners 314. Any of the members 204 can access the content voting feature 202 from product details pages 316 of the online stores that present the game titles 212 in the voting campaigns 232. The product details pages 316 include information presented on the screens 312 that describe the games 208.

The notification module 302, the information module 304, and the game module 306 can be implemented with hardware units in the electronic processing system 100. For example, the notification module 302, the information module 304, and the game module 306 can be implemented with the game consoles 102 of FIG. 1, the social gaming network 104 of FIG. 1, the servers 106 of FIG. 1, the user connections 108 of FIG. 1, the storage device 110 of FIG. 1, the processor 112 of FIG. 1, the display devices 114 of FIG. 1, the controllers 116 of FIG. 1, the input/output unit 118 of FIG. 1, or a combination thereof.

Figure 4:
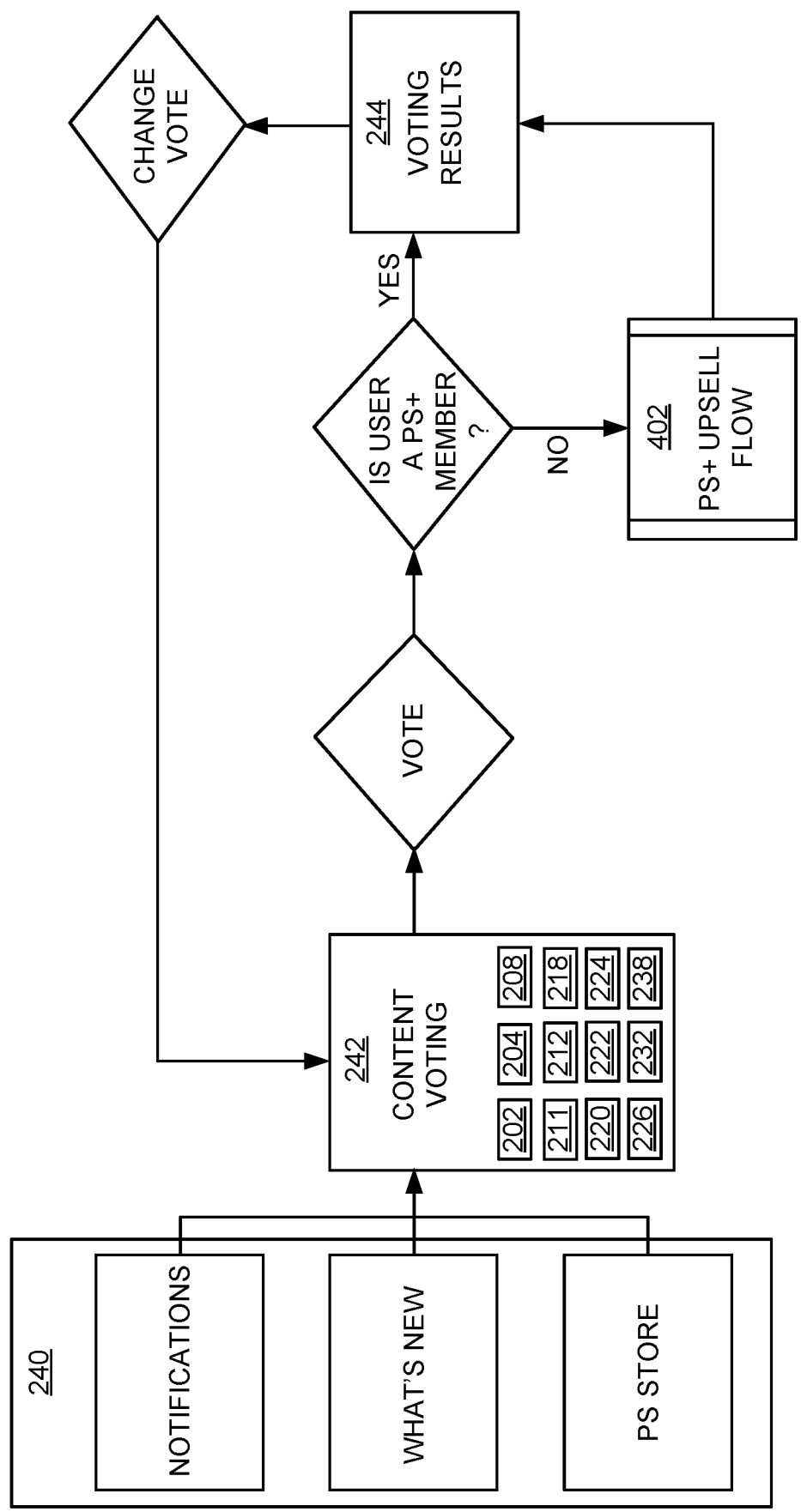
FIG. 4 is a second detailed block diagram of the content voting feature.

Referring now to FIG. 4, therein is shown a second detailed block diagram of the content voting feature 202. The electronic processing system 100 of FIG. 1 includes the source module 240, the vote module 242, and the result module 244. The electronic processing system 100 includes a member module 402.

The content voting feature 202 includes a capability for the electronic processing system 100 to gate, check, or verify the users who want to vote the game titles 212. The term "gate" refers to a checking process utilized to determine if the users who want to vote are the non-members 211 or the members 204.

The vote module 242 determines whether or not the users want to vote the game titles 212. If so, the vote module 242 determines whether or not the users, who want to vote, are the members 204 with the exclusive memberships 226.

If the users are not the members 204, the member module 402 allows the users to register for the accounts in order to become the members 204 with the exclusive memberships 226. The member module 402 allows the non-members 211 to view all of the game titles 212 in the voting campaigns 232.

If interested, the non-members 211 can purchase or register for the exclusive memberships 226 to become the members 204. For example, the member module 402 can include the PlayStation Plus (PS+) upsell flow. After the non-members 211 register for the exclusive memberships 226, it would promote a unique experience among the users of the game consoles 102 with an increase involvement of new and existing ones of the members 204. Such experience provides an interactive feature that would in return benefits consumers of the game consoles 102.

Once registered, the members 204 can vote the game titles 212. After the voting campaigns 232 complete, the result module 244 generates and presents the voting results 238 with ranking of the game titles 212 according to the voting mechanism or the selection process.

All of the users can be able to view the vote contents 218 in the voting campaigns 232. However, when the users decide to vote, the vote module 242 checks if the users are the members 204 or not. If yes, then the vote module 242 allows the users to vote.

The game titles 212 with the highest number 220 of the votes 222 can be available for free for a limited time to the members 204 who have voted for the game titles 212. Others of the game titles 212 that do not have the highest number 220 of the votes 222 in the voting campaigns 232 can be available with a discount or the reduced rates 224.

It has been discovered that gating or checking the users who want to vote the game titles 212 promotes shared experience among the users in the gaming community. The shared experience is promoted because more of the non-members 211 would register to join the exclusive memberships 226 in order to have a chance to vote and share feedbacks of the games 208, resulting in an increase of involvement of new and existing ones of the members 204 as well as an increase in revenue and retention.

Figure 5:
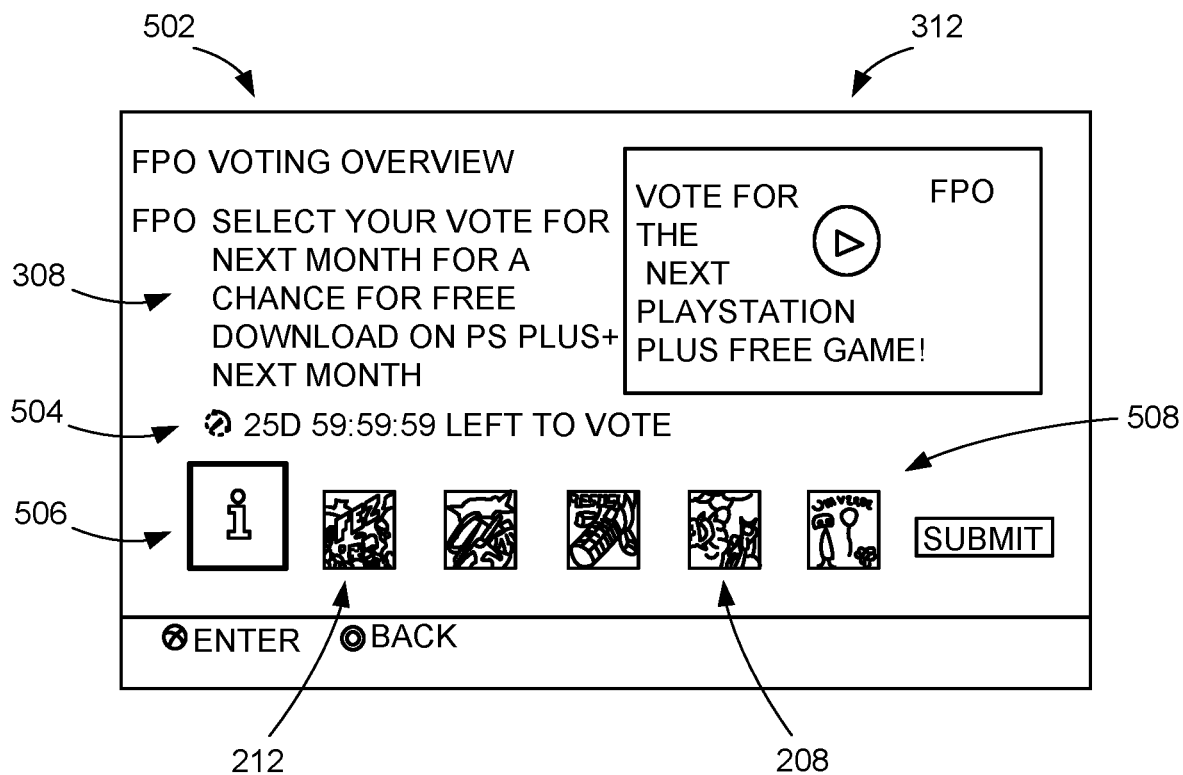
FIG. 5 is an example of a voting overview presented on one of the screens.

Referring now to FIG. 5, therein is shown an example of a voting overview 502 presented on one of the screens 312. The voting overview 502 includes information that informs the members 204 of FIG. 2 of a number of the game titles 212 so that the members 204 can inquire.

The members 204 can select one of the game titles 212 during the voting timeframe 234 of FIG. 2 for a chance for a free download of the one of the game titles 212 on the game consoles 102 of FIG. 1. The selection can occur after the voting campaigns 232 of FIG. 2 complete and the one of the game titles 212 that the members 204 have selected receives the highest number 220 of FIG. 2 of the votes 222 of FIG. 2.

The voting overview 502 enables the members 204 to find out about the game titles 212 that are upcoming and to be released. The members 204 can select the game titles 212 and press an enter button or an enter menu to select the games 208 for voting.

The voting overview 502 includes a timestamp 504, which is a duration of time remained during one of the voting campaigns 232 for voting. The timestamp 504 includes numerical values that indicate a number of days, hours, minutes, and seconds of time left for the members 204 to vote.

When an information icon 506, denoted as "i", shown in the lower left corner of the screens 312 is selected, the voting overview 502 is presented. In the upper right corner of the screens 312, the system notifications 308 can be generated and presented to inform the members 204 to vote to download the games 208 for free, which is available only to the members 204 with the exclusive memberships 226 of FIG. 2.

The members 204 can have an option to click on a play button near the upper right corner of the screens 312 to play or show a video clip of the voting overview 502. The video clip can include information of the game titles 212 for the voting campaigns 232.

Game tiles 508 of the game titles 212 can be presented in the bottom of the screens 312 are. The members 204 can select one of the game tiles 508 that the members 204 want to vote.

Figure 6:
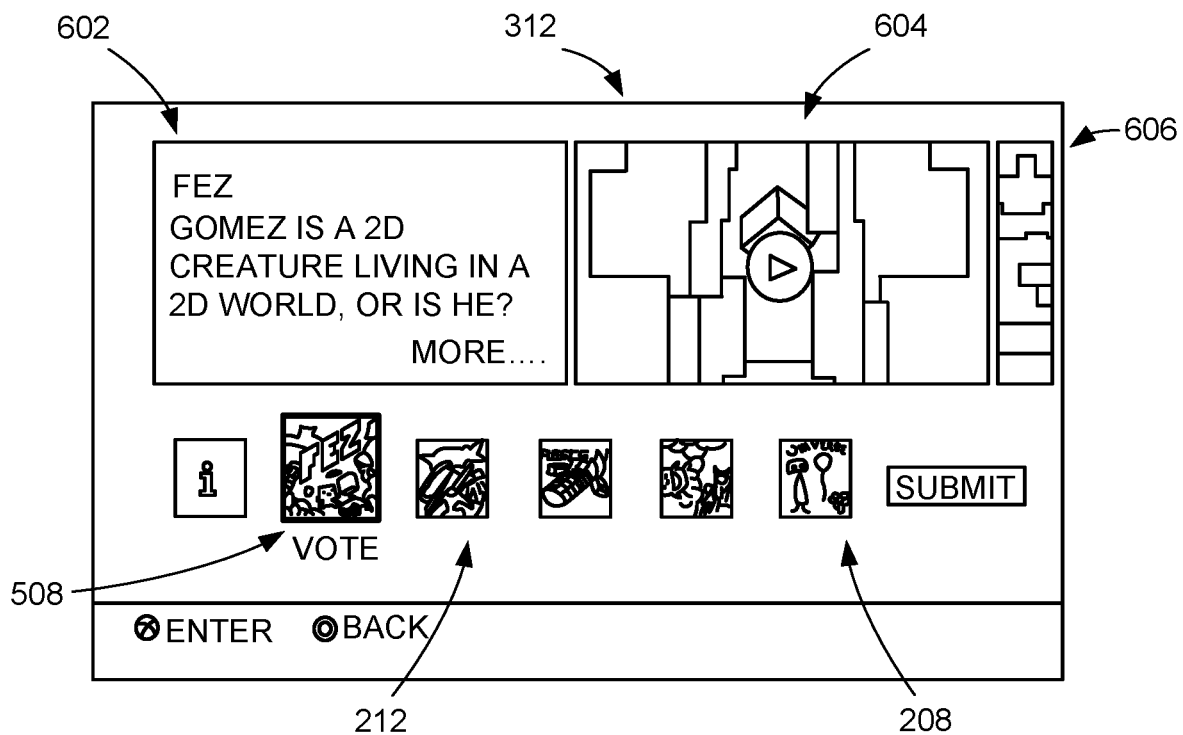
FIG. 6 is an example of a title overview of one of the game titles.

Referring now to FIG. 6, therein is shown an example of a title overview 602 of one of the game titles 212. After one of the game tiles 508 is selected, the title overview 602 of the one of the game titles 212 can be presented along with a video clip 604 or a screenshot 606 of the one of the game titles 212.

The title overview 602 includes a description of one of the game titles 212. The video clip 604 includes a preview or a trailer of portions of one of the games 208. The screenshot 606 includes a picture or a video frame captured while one of the games 208 is played.

The members 204 of FIG. 2 can have an option to scroll the screens 312 to the right to completely view the screenshot 606. After the members 204 select one of the game tiles 508 at the bottom of the screens 312, a text "Vote" can be generated and presented below the one of the game tiles 508 that has been selected to indicate that the members 204 have decided to vote on the one of the game tiles 508.

The one of the game tiles 508 that has been selected is presented with a size bigger or greater than sizes of others of the game tiles 508 that are not selected. The bigger size improves a user interface of the game consoles 102 of FIG. 1 because the bigger size clearly indicates which of the game titles 212 is the one that the members 204 have selected to vote.

As the cursor is moved to the icon of the game titles 212, the icon gets bigger compare to other the game titles 212 to indicate the game titles 212 of interest. The icon can be selected using a button or an enter key on a game console.

After the one of the game tiles 508 that has been selected, the members 204 can select a submit button on the screens 312 to complete a selection process of the game tiles 508. However, after completion of the selection process, the members 204 can have an option to re-select or change to another of the game titles 212 to vote before the voting campaigns 232 of FIG. 2 end.

It has been discovered that one of the game tiles 508 having a size bigger or greater than sizes of others of the game tiles 508 improves a user interface. The user interface is improved because the bigger size clearly indicates which of the game titles 212 is the one that the members 204 have selected to vote.

Figure 7:
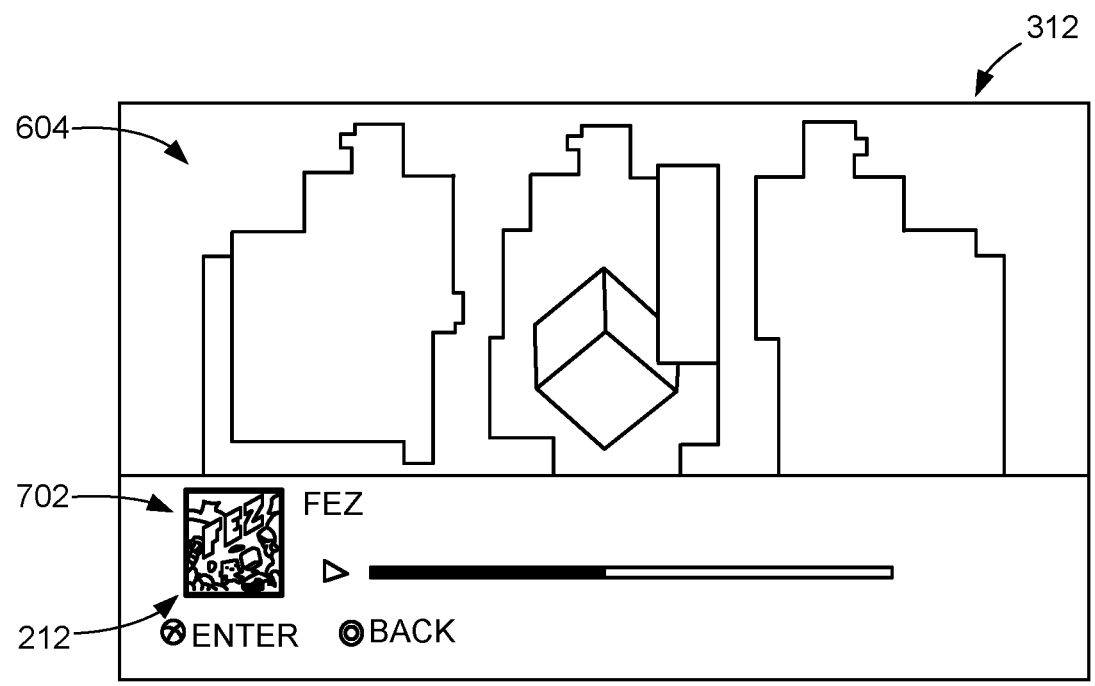
FIG. 7 is an example of the video clip.

Referring now to FIG. 7, therein is shown an example of the video clip 604. The video clip 604 of one of the games xx can be presented after one of the game titles 212 has been selected. Game images 702 of the game titles 212 can be presented, as shown in the lower left corner of the screens 312, so that the members 204 of FIG. 2 can recognize that the video clip 604 is associated with the one of the game titles 212.

The members 204 can control the payback of the video clip 604 using a pay button or a pause button on presented on the screens 312. An elapsed time and a total time of the video clip 604 can be presented, as shown in the lower right corner of the screens 312.

Figure 8:
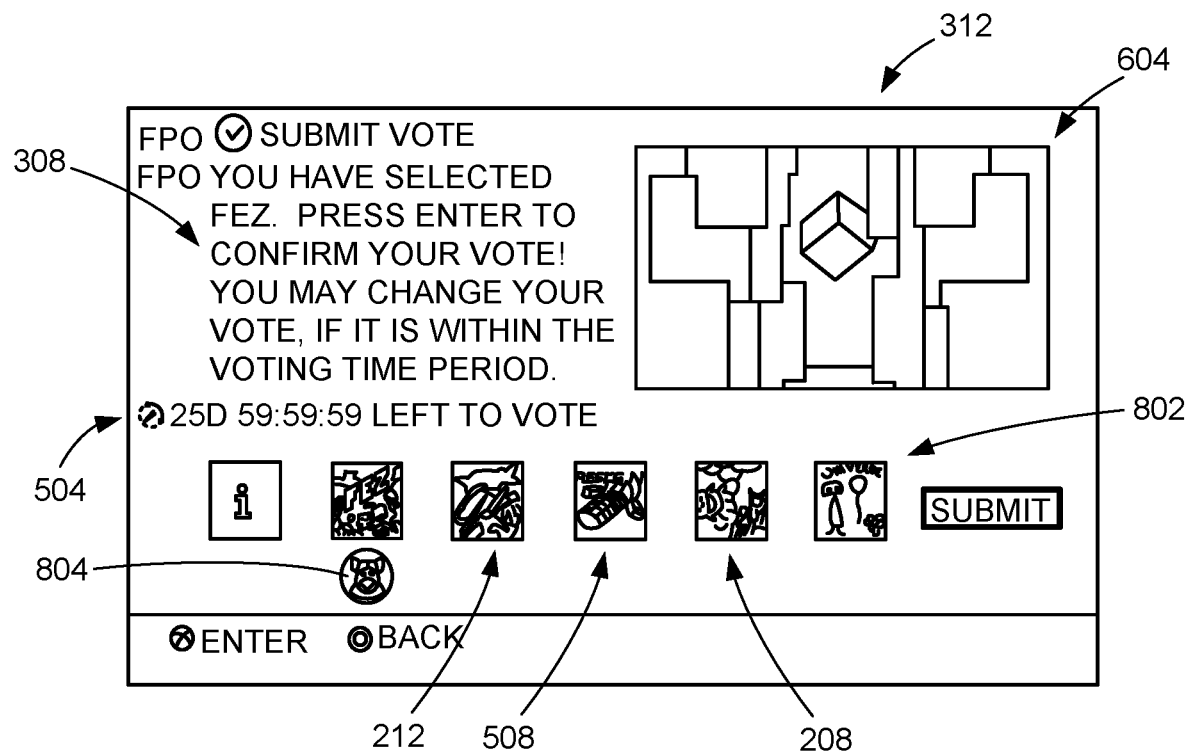
FIG. 8 is an example of one of the screens with voting contents.

Referring now to FIG. 8, therein is shown an example of one of the screens 312 with voting contents 802. The voting contents 802 include a number of the game titles 212 in the bottom of the screens 312. The members 204 of FIG. 2 can vote the games 208 by selecting one of the game titles 212 associated with the games 208. The source module 240 of FIG. 2 can provide the voting contents 802 of the games 208 for utilizing the content voting feature 202 of FIG. 2 in the social gaming network 104 of FIG. 1.

After one of the game titles 212 is selected, the system notifications 308 can be presented in the upper left corner of the screens 312 to indicate that the members 204 have selected the one of the game titles 212. With the submit button highlighted, the members 204 can click or select the enter button or the enter menu to complete and confirm a submission of a vote or the selection of the one of the game titles 212.

The timestamp 504 can be presented to indicate a time left or remained for the members 204 to vote. A presentation of the video clip 604 of one of the games 208 can be in the upper right corner of the screens 312.

The members 204 can optionally re-select or change to another of the game titles 212 to vote within the voting timeframe 234 of FIG. 2 and before the voting campaigns 232 of FIG. 2 end. After one of the game titles 212 has been selected for the votes 222 of FIG. 2, an avatar 804 is presented below one of the game tiles 508 associated with the one of the game titles 212 that has been selected.

The avatar 804 is an icon or a figure that represents one of the members 204, who has selected the one of the game tiles 508 to submit the vote. The result module 244 of FIG. 2 can generate the avatar 804 associated with the exclusive memberships 226 of FIG. 2. The result module 244 can present the game images 702 of the game titles 212 with the avatar 804 next to the game images 702 for identifying an association between the game titles 212 and the exclusive memberships 226.

It has been discovered that the avatar 804 improves the user interface of the game consoles 102 of FIG. 1 because the avatar 804 clearly identifies the game titles 212 so that the members 204 are able to recognize the game titles 212 that the members 204 have selected.

Figure 9:
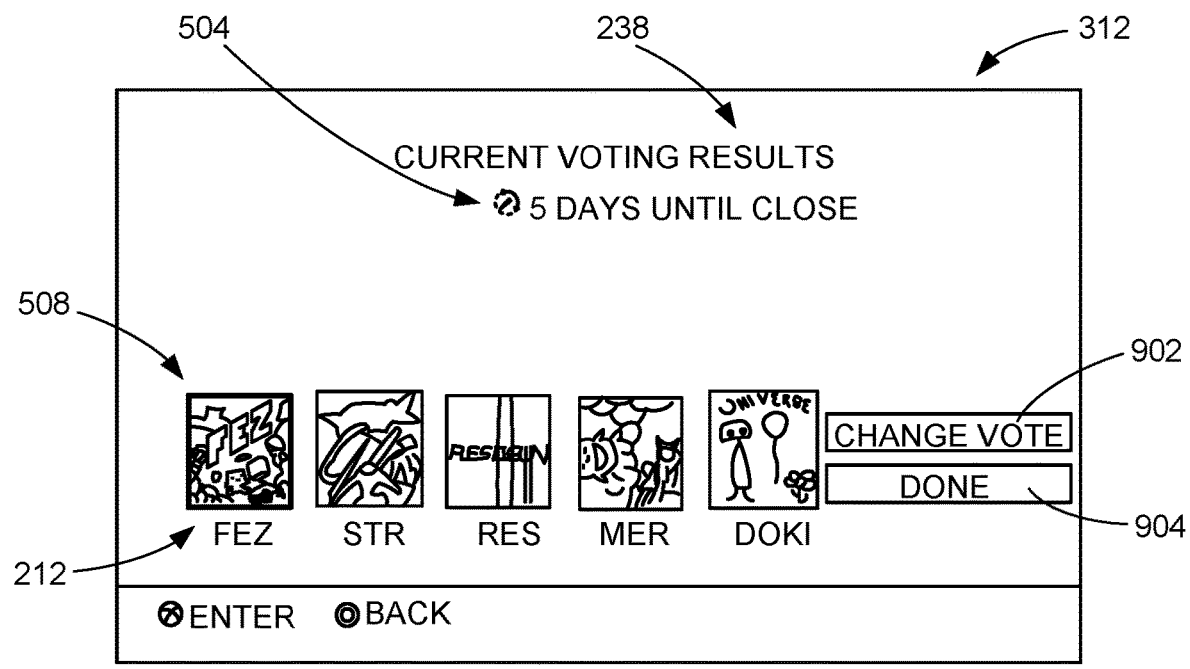
FIG. 9 is a first example of one of the screens with the voting results.

Referring now to FIG. 9, therein is shown a first example of one of the screens 312 with the voting results 238. The voting results 238 can be presented during the voting campaigns 232 of FIG. 2.

The example show current or update-to-date status of the voting results 238. The timestamp 504 can be presented near the top of the screens 312 to indicate when the voting campaigns 232 end or close.

The members can select a change vote option 902 to change to another of the game titles 212 to vote before the voting campaigns 232 end. The members can select a done option 904 to complete the selection process for the vote. The game titles 212 can be presented below the game tiles 508.

Figure 10:
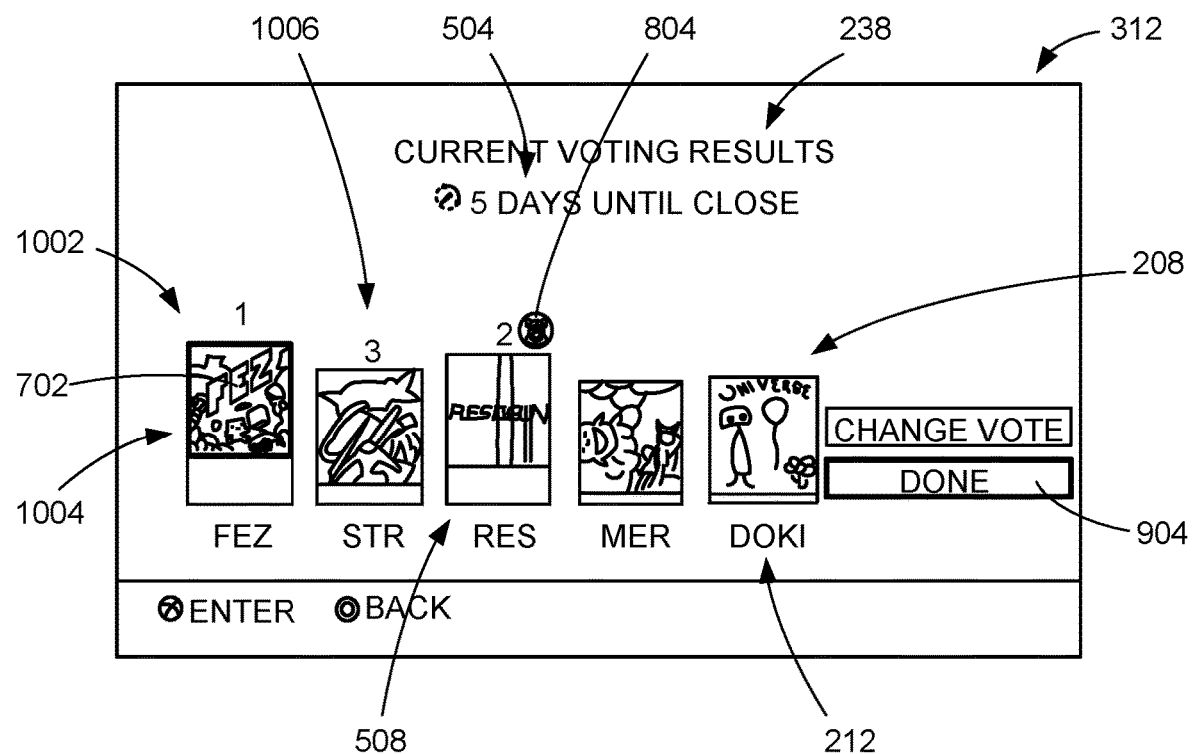
FIG. 10 is a second example of one of the screens with the voting results.

Referring now to FIG. 10, therein is shown a second example of one of the screens 312 with the voting results 238. The voting results 238 can be presented during the voting campaigns 232 of FIG. 2.

The timestamp 504 can be presented near the top of the screens 312 to indicate when the voting campaigns 232 end or close. The voting results 238 can include current standings 1002 of the game titles 212. The current standings 1002 can be generated or updated as the game titles 212 are voted during the voting campaigns 232.

The current standings 1002 include status information of each of the game titles 212 that are voted in the voting campaigns 232. The current standings 1002 are up-to-date as of a time when the members 204 of FIG. 2 view the voting results 238 on the screens 312.

The current standings 1002 can include different heights 1004 for the game tiles 508. Each of the game tiles 508 can have one of the different heights 1004. The different heights 1004 are determined based on a rank number 1006 of each of the game tiles 508 that participate in the voting campaigns 232. The rank number 1006 identifies how each of the game titles 212 compare with others of the game titles 212.

The rank number 1006 is updated and assigned to the games 208 as the members 204 complete the votes 222 of FIG. 2 of the game titles 212. The result module 244 of FIG. 2 can generate the rank number 1006 of the game titles 212 based on the voting results 238. The result module 244 can generate the game images 702 of the game titles 212, the game titles 212 having the different heights 1004 determined based on the rank number 1006 for presenting on the screens 312.

The game titles 212 that rank the highest in the voting results 238 can have the rank number 1006 of one (1), the game titles 212 that rank the second highest in the voting results 238 can have the rank number 1006 of two (2), and so on. The game titles 212 that rank the highest because the game titles 212 have the most number of the votes 222 compared with all others of the game titles 212.

The game titles 212 that rank the highest with the rank number of one can have the different heights 1004 greater than all of the different heights 1004 of the others of the game titles 212. The game titles 212 that rank the second highest with the rank number of two can have the second highest of the different heights 1004.

The avatar 804 of one of the members 204 can be presented next to the rank number 1006 associated with one of the games 208 for which the one of the members 204 have voted. The avatar 804 can be presented above the game images 702 shown in the game tiles 508. The game titles 212 can be presented below the game images 702. The members 204 can select or press the done option 904 when the members 204 finish with and want to exit the selection process.

It has been discovered that the different heights 1004 improve the user interface of the game consoles 102 of FIG. 1 because the different heights 1004 clearly indicate the game titles 212 that the members 204 have selected in comparison with others of the game titles 212.

Figure 11:
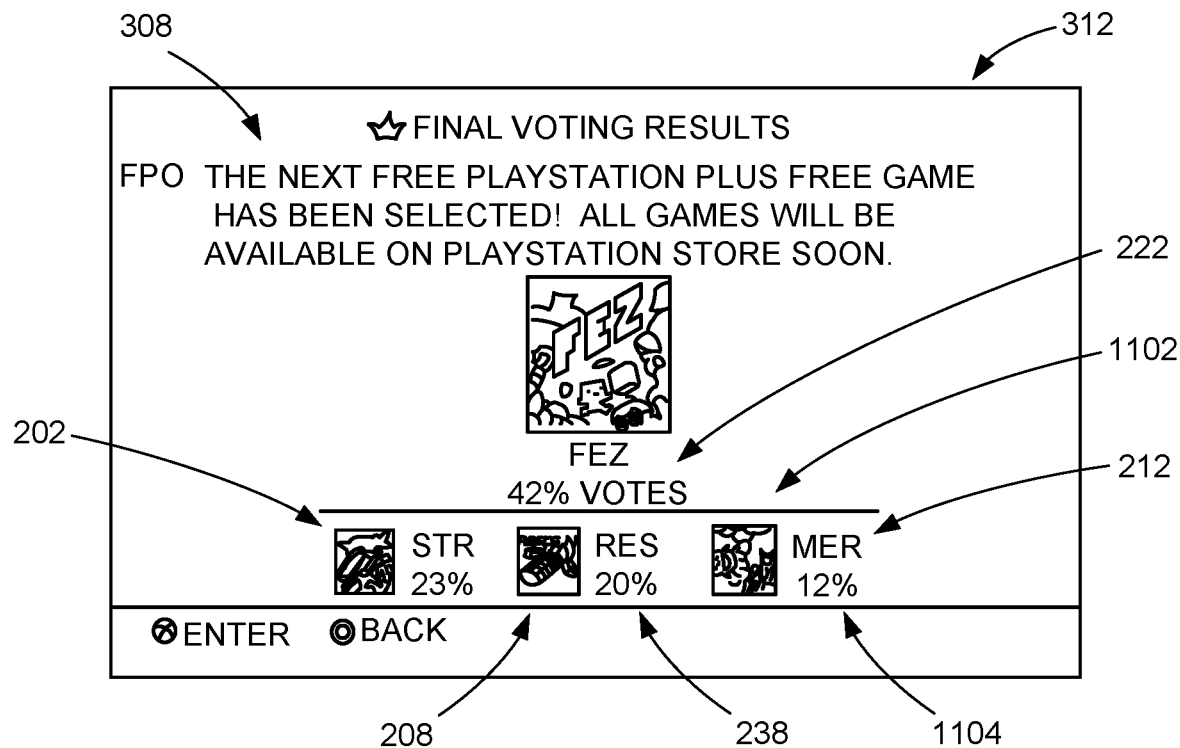
FIG. 11 is an example of one of the screens with final voting results of the voting campaigns.

Referring now to FIG. 11, therein is shown an example of one of the screens 312 with final voting results 1102 of the voting campaigns 232 of FIG. 2. The final voting results 1102 are the voting results 238 after the voting timeframe 234 of FIG. 2 ends.

When the final voting results 1102 are generated, the game titles 212 that have been determined as having the highest number 220 of FIG. 2 of the votes 222 can be available to the members 204 of FIG. 2, who have voted for the game titles 212, to play for free when the games 208 are released. The members 204 with the exclusive memberships 226 of FIG. 2 can play the games 208 associated with the game titles 212 for free because there are no monetary values associated with the games 208 when the members play the games 208.

The games 208 are released after the product development complete, the games 208 can be available for play to all of the users who have not participated in the voting campaigns 232. The games 208 can be available on the online stores or the websites subsequently after the games 208 are developed and released.

The final voting results 1102 can include vote percentages 1104 of the game titles 212 that have been voted in the voting campaigns 232. Each of the vote percentages 1104 indicates a percent of a number of the votes 222 over the total number of the votes 222 for each of the game titles 212 that have been voted in the voting campaigns 232.

When the voting campaigns 232 end, the users can receive the system notifications 308 if the users are the members 204, who have the exclusive memberships 226. At the end of the voting campaigns 232, the members 204 can click on the What's New tile, and the electronic processing system 100 of FIG. 1 can promote the final voting results 1102 of the game titles 212. At the end of the voting campaigns 232, the members 204 can view the product details pages 316 of FIG. 3 of the games 208 in the instant game collection 214 of FIG. 2 (IGC) that have been included in the voting campaigns 232, and the electronic processing system 100 can link to the final voting results 1102.

When the voting timeframe 234 is over, the games 208 having the game titles 212 can be released. When the game titles 212 that are winning titles are released and the members 204 voted for the game titles 212, the consumer will receive the system notifications 308 that the game titles 212 are now available. The game titles 212 are the winning titles when the game titles 212 rank the highest in the final voting results 1102.

The system notifications 308 can link to the product details pages 316 of the games 208 in the instant game collection 214. From the product details pages 316, the users can check to determine if the users are the members 204 who have the exclusive memberships 226.

If the users are the members 204, then the users can download or add to a library or a collection of the games 208 in the users' accounts, and the users can go to the product details pages 316. If the users are not the members 204, then the users, who are the non-members 211 of FIG. 2, can purchase or register for the exclusive memberships 226 to become the members 204, and the users can go to the product details pages 316.

Success of the content voting feature 202 can be tracked or monitored. The success of the content voting feature 202 can be tracked based on a number of the members 204 voting from the system notifications 308, the banners 314 of FIG. 3 of the stores presented by the game consoles 102 of FIG. 1 in the social gaming network 104 of FIG. 1, and the What's New tile. The success of the content voting feature 202 can be tracked based on a number of the non-members 211 subscribed using the member module 402 of FIG. 4 from the banners 314 of the stores and the What's New tile.

The success of the content voting feature 202 can be tracked by identification of data traffic flows for the content voting feature 202. The success of the content voting feature 202 can be tracked based on how many of the members 204 are going back to change the votes 222. The success of the content voting feature 202 can be tracked based on how many times the same member is going back to check the voting results 238 before the voting campaigns 232 are over and after they are over.

Figure 12:
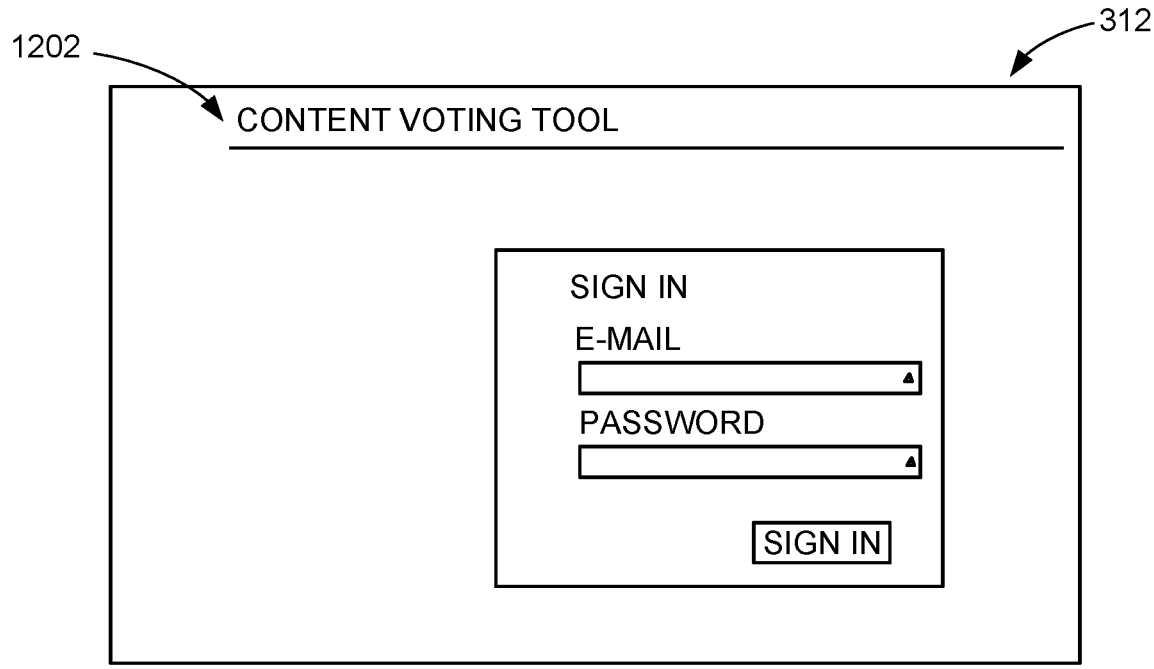
FIG. 12 is an example of one of the screens with presentation of a content voting tool.

Referring now to FIG. 12, therein is shown an example of one of the screens 312 with presentation of a content voting tool 1202. The content voting tool 1202 enables the members 204 of FIG. 2 to have access to the content voting feature 202 of FIG. 2.

The example shows an interface of the content voting tool 1202 that allows the members 204 to sign in to the accounts in order to vote for the game titles 212 of FIG. 2. The content voting tool 1202 provides the interface for the members 204 to enter an e-mail and a password to log in the accounts. The interface provides a method for the members 204 to instruct the content voting tool 1202 to remember or register the e-mail or a username of one of the members 204.

A flow of the content voting feature 202 is described below. Store operators of the stores can create products or the games 208 of FIG. 2 in a network product planning team (NPMT). The store operators can create the voting campaigns 232 of FIG. 2 for the content voting feature 202 by utilizing the content voting tool 1202 and publish the voting campaigns 232 when ready.

A voting system (Kamaji/Navigator) can automatically pick up or receive a start request of the voting campaigns 232 and can send the system notifications 308 of FIG. 3 indicating that the voting campaigns 232 have started for the instant game collection 214 of FIG. 2. The store operators can update the products in the NPMT with regards to the voting results 238 of FIG. 2 of the content voting feature 202.

The voting system (Kamaji/Navigator) can automatically pick up or receive a campaign end status of the voting campaigns 232 and can send the system notifications 308 indicating that the voting campaigns 232 have ended for the instant game collection 214. The store operators can update the products, in the NPMT, to include winning contents or the game titles 212 with the highest number 220 of FIG. 2 of the votes 222 of FIG. 2 in the instant game collection 214. The voting system (Kamaji/Navigator) can automatically send the system notifications 308 when the game titles 212 are released. Kamaji is a technology stack that provides the front-end or user experience, and Navigator is another technology stack that provides the back-end information, e.g., the game content skus, entitlements, account information and other information.

Referring now to FIG. 13, therein is shown an example of one of the screens 312 with presentation of the voting campaigns 232. The content voting tool 1202 can show or present a list 1302 of all the voting campaigns 232 for the users to view. The members 204 of FIG. 2 can have an option of adding or creating a new voting campaign 1304.

The list 1302 can be processed, filtered, or presented based on campaign names 1306 and campaign statuses 1308 of the voting campaigns 232. For example, the list 1302 can be generated to include specific ones of the campaign names 1306 or an alphabetical order of all of the campaign names 1306. Also for example, the campaign statuses 1308 can include active and in active. Further, for example, the list 1302 can be generated to include all of the campaign names 1306 and the campaign statuses 1308.

An option for the store operators to edit the voting campaigns 232 can be provided in the left most column of the table shown on the screens 312. A column for the campaign statuses 1308 shows whether each of the voting campaigns 232 is active or inactive.

The example shows when the voting campaigns 232 start and end as well as a number of locales or the geographical regions 230 of FIG. 2 associated with the voting campaigns 232. The example also shows when the voting timeframe 234 starts and ends. The users can have an option to view the voting results 238 of the voting campaigns 232.

Figure 14:
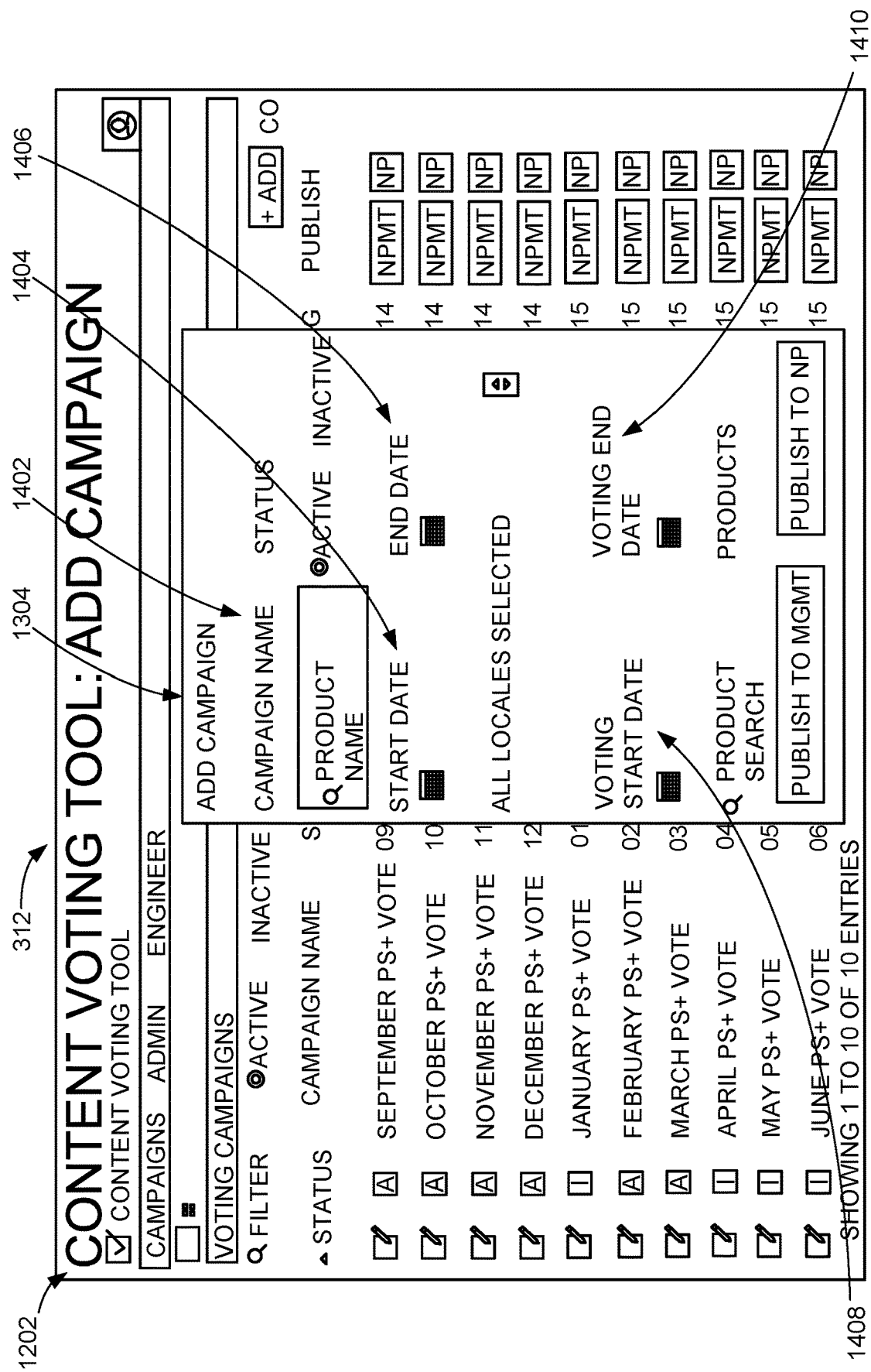
FIG. 14 is an example of one of the screens for addition of the new voting campaign.

Referring now to FIG. 14, therein is shown an example of one of the screens 312 for addition of the new voting campaign 1304. The content voting tool 1202 includes a mechanism for the store operators to optionally add the new voting campaign 1304.

The store operators can specify a campaign name 1402, a campaign start date 1404, and a campaign end date 1406 of the new voting campaign 1304. The store operators can select locales or the geographical regions 230 of FIG. 2 of the new voting campaign 1304.

A product name or the campaign name 1402 is a designation of the new voting campaign 1304 and utilized only within the content voting tool 1202. The campaign name 1402 is not a name that appears on a client's terminal. The campaign start date 1404 and the campaign end date 1406 are dates of an overall period of the new voting campaign 1304. These dates can be used to run pre-campaign marketing promotions.

The store operators can specify or set a voting start date 1408 and a voting end date 1410 of the new voting campaign 1304. The voting start date 1408 and the voting end date 1410 provide the voting timeframe 234 of FIG. 2 that allows the members 204 of FIG. 2 to vote on the voting contents 802 of FIG. 8.

The store operators can have an option to perform a product search of the games 208 of FIG. 2. The store operators can search for the voting contents 802. The voting contents 802 can appear below the search option and can be drag-n-dropped into a product box of the games 208. Products are the games 208 to be voted on.

Figure 15:
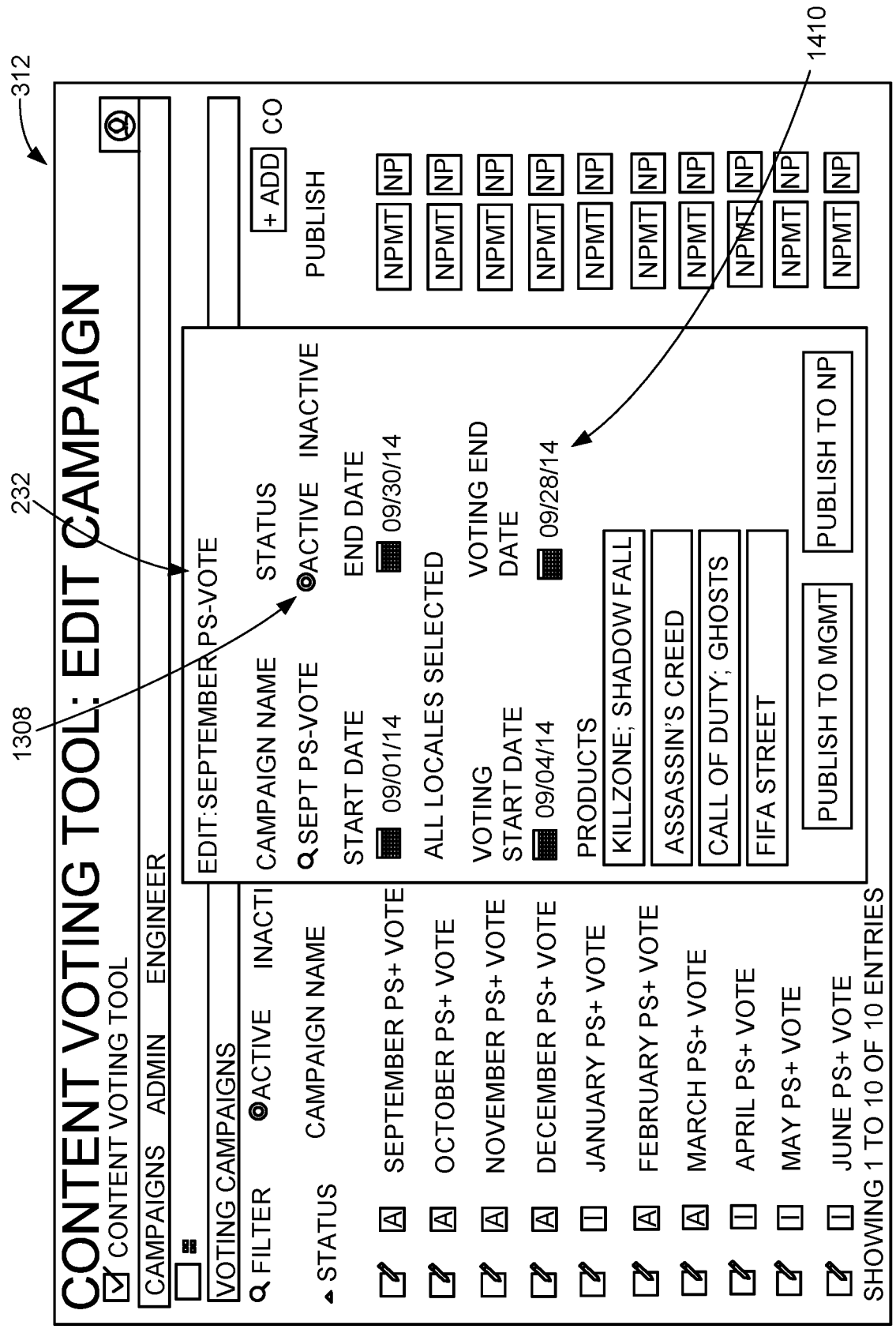
FIG. 15 is an example of one of the screens for editing of the voting campaigns.

Referring now to FIG. 15, therein is shown an example of one of the screens 312 for editing of the voting campaigns 232. Only a certain type of the campaign statuses 1308 can be edited. The voting campaigns 232 that are active, which are also referred as live campaigns, can be edited by the store operators.

The voting campaigns 232 that are inactive and thus may not be edited can include campaigns that are not running but could have already been published to the Network Platform (NP). NP is considered the backend infrastructure that PlayStation Network is built on. The screens 312 can show the voting campaigns 232 that are active, and only the voting end date 1410 of the voting campaigns 232 can be edited.

Figure 16:
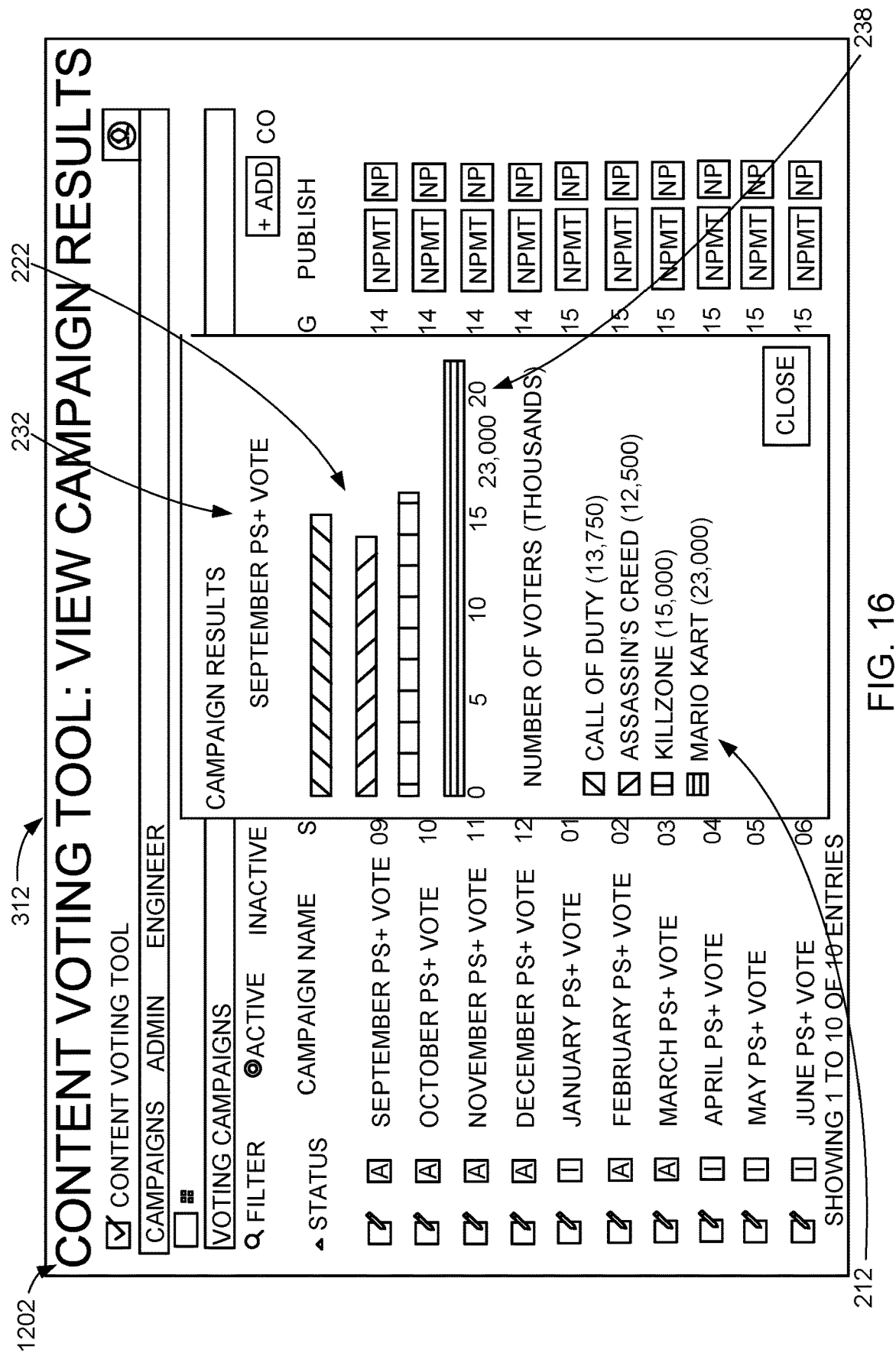
FIG. 16 is an example of one of the screens for viewing the voting results of the voting campaigns.

Referring now to FIG. 16, therein is shown an example of one of the screens 312 for viewing the voting results 238 of the voting campaigns 232. The content voting tool 1202 shows statuses of the votes 222 for each of the game titles 212. The voting results 238 can represent a global cumulative number of the votes 222 per each of the game titles 212.

Figure 17:
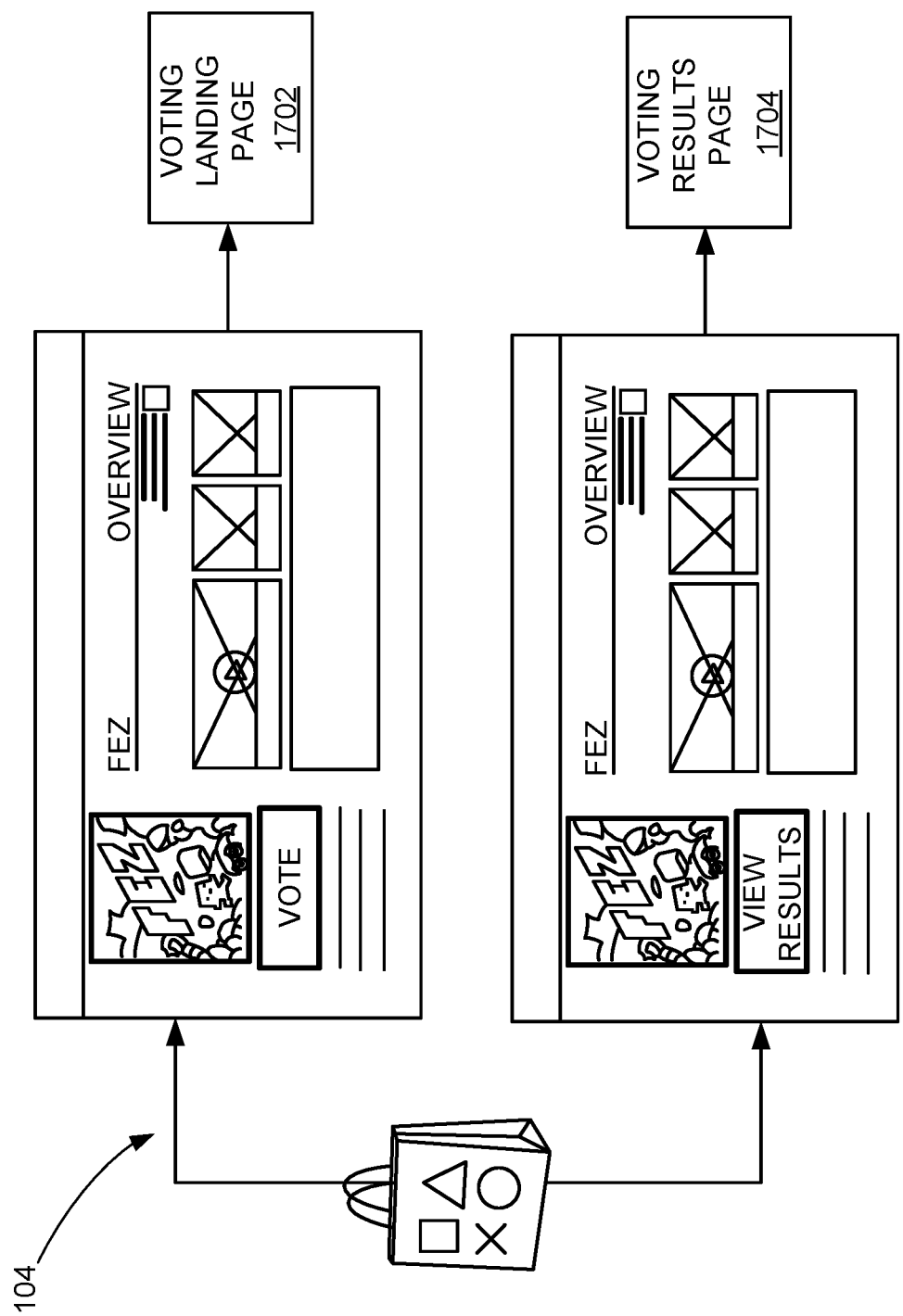
FIG. 17 is a diagram of access to the voting campaigns.

Referring now to FIG. 17, therein is shown a diagram of access to the voting campaigns 232 of FIG. 2. The voting campaigns 232 can be accessed from the online stores in order to view the product details pages 316 of FIG. 3 (PDP).

The product details pages 316 enable the users to view a voting landing page 1702 of one of the voting campaigns 232. The voting landing page 1702 shows where a voting application is utilized or the selection process is going on. The voting landing page 1702 is the first page of the voting application.

The product details pages 316 enable the users to view a voting result page 1704. The voting result page 1704 includes information about the voting campaigns 232 of the voting results 238 of FIG. 2 during the voting timeframe 234 of FIG. 2 or the final voting results 1102 of FIG. 11 after the voting campaigns 232 end.

The product details pages 316 can be provided in the social gaming network 104, as shown on the left of FIG. 17. The social gaming network 104 provides a mechanism for the users on the game consoles 102 of FIG. 1 to view what contents have been voted in the voting campaigns 232.

Figure 18:
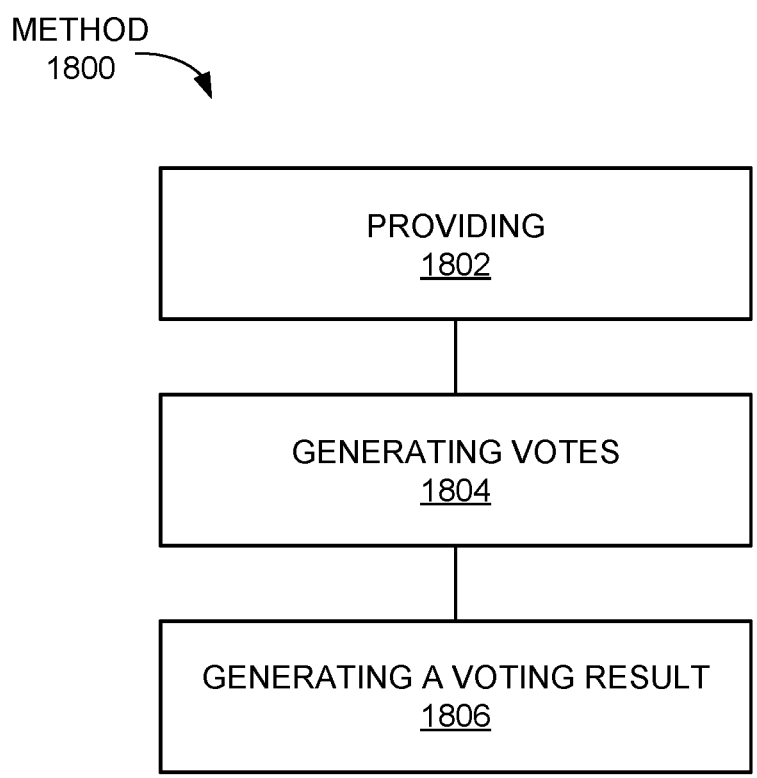
FIG. 18 is a flow chart of a method of operation of an electronic processing system in a further embodiment of the present invention.

Referring now to FIG. 18, therein is shown a flow chart of a method 1800 of operation of an electronic processing system in a further embodiment of the present invention. The method 1800 includes: providing a voting content of a game for utilizing a content voting feature in a social gaming network in a block 1802; generating votes for the game based on the voting content by selecting a game title of the game in a voting timeframe during a development of the game, the votes generated for exclusive memberships in a block 1804; and generating a voting result based on the votes in the voting timeframe for displaying on a screen in a block 1806.

Thus, it has been discovered that the electronic processing system 100 of FIG. 1 of the embodiments of the present invention furnish important and heretofore unknown and unavailable solutions, capabilities, and functional aspects for the electronic processing system 100 with the social network mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the embodiments of the present invention is that it valuably supports and services the historical trend of reducing costs, simplifying systems, and increasing performance.

These and other valuable aspects of the embodiments of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an electronic processing system comprising:
   providing a voting content of a video game for utilizing a content voting feature in a social gaming network;
   generating votes for the video game based on the voting content by selecting a game title of the video game in a voting timeframe during a development of the video game, the votes generated for exclusive memberships, wherein the game title is included in a game tile, further wherein a selected game tile is presented with a bigger size than unselected game tiles, wherein a voter has an option to change a vote within a voting timeframe which induces game developers to add or modify features in games;
   determining whether a location of the voter is within a geographical region;
   displaying a timestamp including a duration of time remaining related to the voting timeframe;
   generating a voting result based on the votes within the geographical region and in the voting timeframe for displaying on a screen, wherein generating the voting result includes generating the voting result based on a highest number of votes; and
   updating an instant game collection based on the game title having the highest number of the votes for playing the video game associated with the game title on the social gaming network.

2. The method as claimed in claim 1 wherein generating the voting result includes generating the voting result based on a highest number of the votes.

3. The method as claimed in claim 1 further comprising generating an avatar associated with the exclusive membership.

4. The method as claimed in claim 1 further comprising generating a rank number of the game title based on the voting result.

5. The method as claimed in claim 1 wherein generating the votes include generating the votes during voting campaigns, only one of the voting campaigns in a campaign timeframe.

6. A method of operation of an electronic processing system comprising:
   providing a voting content of a video game for utilizing a content voting feature in a social gaming network;
   generating a system notification for the content voting feature in voting campaigns;
   generating votes for the video game based on the voting content and the system notification by selecting a game title of the video game in a voting timeframe during a development of the video game, the votes generated for exclusive memberships, wherein the game title is included in a game tile, further wherein a selected game tile is presented with a bigger size than unselected game tiles, wherein a voter has an option to change a vote within a voting timeframe which induces game developers to add or modify features in games;

determining whether a location of the voter is within a geographical region;

displaying a timestamp including a duration of time remaining related to the voting timeframe;

generating a voting result based on the votes within the geographical region and in the voting timeframe for displaying on a screen, wherein generating the voting result includes generating the voting result based on a highest number of votes; and updating an instant game collection based on the game title having the highest number of the votes for playing the video game associated with the game title on the social gaming network.

7. The method as claimed in claim 6 further comprising:
generating an avatar associated with the exclusive membership; and
presenting a game image of the game title with the avatar next to the game image for identifying an association between the game title and the exclusive membership.

8. The method as claimed in claim 6 further comprising:
generating a rank number of the game title based on the voting result; and
generating a game image of the game title, the game image having a height determined based on the rank number for presenting on the screen.

9. The method as claimed in claim 6 wherein:
providing the voting content includes providing the voting content for utilizing a global feature in the social gaming network; and
generating the votes includes generating the votes during the voting campaigns, only one of the voting campaigns in a campaign timeframe and globally applied to a number of geographical regions.

10. An electronic processing system comprising:
a source module for providing a voting content of a video game for utilizing a content voting feature in a social gaming network;
a vote module, coupled to the source module, for generating votes for the video game based on the voting content by selecting a game title of the video game in a voting timeframe during a development of the video game, the votes generated for exclusive memberships, wherein the game title is included in a game tile, further wherein a selected game tile is presented with a bigger size than unselected game tiles, wherein a voter has an option to change a vote within a voting timeframe which induces game developers to add or modify features in games;

a determination module, coupled to the vote module, for determining whether a location of the voter is within a geographical region;

a display module, coupled to the vote module, for displaying a timestamp including a duration of time remaining related to the voting timeframe;

a result module, coupled to the vote module, for generating a voting result based on the votes within the geographical region and in the voting timeframe for displaying on a screen, wherein generating the voting result includes generating the voting result based on a highest number of votes; and further wherein the vote module is for updating an instant game collection based on the game title having the highest number of the votes for playing the video game associated with the game title on the social gaming network.

11. The system as claimed in claim 10 wherein the result module is for generating the voting result based on a highest number of the votes.

12. The system as claimed in claim 10 wherein the result module is for generating an avatar associated with the exclusive membership.

13. The system as claimed in claim 10 wherein the result module is for generating a rank number of the game title based on the voting result.

14. The system as claimed in claim 10 wherein the vote module is for generating the votes during voting campaigns, only one of the voting campaigns in a campaign timeframe.

15. The system as claimed in claim 10 wherein:
the result module is for generating a system notification for the content voting feature in voting campaigns; and
the vote module is for generating the votes based on the system notification.

16. The system as claimed in claim 15 wherein the result module is for generating an avatar associated with the exclusive membership and for presenting a game image of the game title with the avatar next to the game image for identifying an association between the game title and the exclusive membership.

17. The system as claimed in claim 15 wherein the result module is for generating a rank number of the game title based on the voting result and for generating a game image of the game title, the game image having a height determined based on the rank number for presenting on the screen.

18. The system as claimed in claim 15 wherein the vote module is for generating the votes during the voting campaigns, only one of the voting campaigns in a campaign timeframe and globally applied to a number of geographical regions.

* * * * *